US011924809B2

(12) United States Patent
Zhang

(10) Patent No.: US 11,924,809 B2
(45) Date of Patent: Mar. 5, 2024

(54) UPLINK TRANSMISSION FOR SCHEDULING RESOURCES USING BUFFER STATUS REPORT

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 374 days.

(21) Appl. No.: 17/412,208

(22) Filed: Aug. 25, 2021

(65) Prior Publication Data

US 2021/0385797 A1    Dec. 9, 2021

Related U.S. Application Data

(63) Continuation of application No. PCT/CN2020/074322, filed on Feb. 5, 2020.

(30) Foreign Application Priority Data

Feb. 26, 2019   (CN) .......................... 201910140360.4

(51) Int. Cl.
*H04W 72/02*       (2009.01)
*H04L 1/00*        (2006.01)
(Continued)

(52) U.S. Cl.
CPC ........... *H04W 72/02* (2013.01); *H04L 1/0038* (2013.01); *H04W 72/1263* (2013.01); *H04W 72/21* (2023.01); *H04W 72/56* (2023.01)

(58) Field of Classification Search
CPC ..... H04W 72/02; H04W 72/56; H04W 72/21; H04W 72/1263; H04W 76/14;
(Continued)

(56) References Cited

U.S. PATENT DOCUMENTS

2011/0199991 A1   8/2011  Harris
2014/0348079 A1   11/2014 Turtinen
(Continued)

FOREIGN PATENT DOCUMENTS

CN    104185290 A    12/2014
CN    104322132 A    1/2015
(Continued)

OTHER PUBLICATIONS

"3rd Generation Partnership Project; Technical Specification Group Radio AccessNetwork; Evolved Universal Terrestrial Radio Access (E-UTRA); Medium Access Control(MAC) Protocol Specification (Release 15)"3GPP TS 36.321 V15.3.0 sections 5.4 and 5.14, Sep. 30, 2018.
(Continued)

*Primary Examiner* — Rushil P. Sampat

(57) ABSTRACT

The present disclosure provides a method and a device for wireless communication in a User Equipment and a base station. In one embodiment, a first node receives a first signal set in a first radio resource pool by blind detection, and recovers a first bit block on a physical layer according to the first signal set; delivers first buffer information from the physical layer to a higher layer; when fulling a first condition set, triggers first information to the higher layer; after triggering of the first information on the higher layer, transmits a first radio signal, the first radio signal comprising the first information; herein, the first information is used to indicate data size contained in buffer that can be transmitted, the first condition set comprises a first condition. The present disclosure improves transmission efficiency and spectrum utilization, and effectively prevents buffer overflow.

20 Claims, 6 Drawing Sheets

(51) Int. Cl.
*H04W 72/1263* (2023.01)
*H04W 72/21* (2023.01)
*H04W 72/56* (2023.01)

(58) Field of Classification Search
CPC ... H04W 28/0278; H04W 28/26; H04W 4/70; H04W 72/0406; H04W 72/1278; H04W 72/14; H04W 72/20; H04W 72/23; H04W 88/04; H04W 92/18; H04L 1/0038; H04L 1/0003

See application file for complete search history.

(56) References Cited

U.S. PATENT DOCUMENTS

| | | | | |
|---|---|---|---|---|
| 2017/0331670 | A1* | 11/2017 | Parkvall | H04L 41/0816 |
| 2017/0353819 | A1* | 12/2017 | Yin | H04W 4/70 |
| 2019/0014606 | A1* | 1/2019 | Li | H04W 88/04 |
| 2021/0212122 | A1* | 7/2021 | Cho | H04W 72/12 |

FOREIGN PATENT DOCUMENTS

| | | |
|---|---|---|
| CN | 106488577 A | 3/2017 |
| CN | 106717052 A | 5/2017 |
| CN | 107071916 A | 8/2017 |
| CN | 107787048 A | 3/2018 |
| CN | 108023872 A | 5/2018 |
| CN | 108811175 A | 11/2018 |
| WO | 2017029646 A1 | 2/2017 |

OTHER PUBLICATIONS

Huawei et al. "SPS Enhancement on Uu for V2X" 3GPP TSG RAN WG1 Meeting #86 R1-166170, Aug. 26, 2016.
Huawei, HiSilicon SR and BSR Enhancement in Short TTI 3GPP TSG-RAN WG2 Meeting#97 R2-1701887 Feb. 4, 2017.
ISR received in application No. PCT/CN2020/074322 dated Apr. 26, 2020.
First Office Action received in application No. CN201910140360.4 dated Aug. 24, 2021.
First Search Report received in application No. CN201910140360.4 dated Aug. 18, 2021.
CN201910140360.4 Notification to Grant Patent Right for Invention dated Jan. 11, 2022.

* cited by examiner

UPLINK TRANSMISSION FOR SCHEDULING RESOURCES USING BUFFER STATUS REPORT

CROSS REFERENCE TO RELATED APPLICATIONS

This application is a continuation of International Application No. PCT/CN2020/074322, filed Feb. 5, 2020, claims the priority benefit of Chinese Patent Application No. 201910140360.4, filed on Feb. 26, 2019, the full disclosure of which is incorporated herein by reference.

BACKGROUND

Technical Field

The present disclosure relates to transmission methods and devices in wireless communication systems, and in particular to a method and device for supporting signal forwarding.

Related Art

The establishment of a higher-layer connection for small data bursts will significantly reduce transmission efficiency of the system, so, the Grant Free transmission is put forward to conserve air-interface resources occupied by signaling transmission.

In 3rd Generation Partner Project (3GPP) Long Term Evolution (LTE) and New Radio (NR) systems, the idea of direct communications between equipment was proposed, including Device to Device (D2D) and Vehicle to Vehicle (V2V) communications.

In a traditional cellular system, a User Equipment (UE) may establish a large number of Radio Bearers, of which each correspond to a Logical Channel; the channel allocation request is started by a higher layer, for example, a Buffer Status Report (BSR) or a Scheduling Request (SR) is triggered by a higher layer.

SUMMARY

Inventors find through researches that in techniques like Grant Free, there is generally a lack of higher-layer connection or efficient scheduling between a base station and a UE, hence lower spectrum efficiency than that based on Grant, therefore, using a UE with higher-layer connection to relay Grant-Free uplink data can help enhance the transmission efficiency. Further studies by inventors have shown that the current mechanism of channel allocation request is still insufficient to fulfill the above-mentioned requirements.

In view of the above discoveries, the present disclosure provides a solution. It should be noted that the embodiments in the present disclosure and the characteristics of the embodiments can be arbitrarily combined if there is no conflict. Furthermore, though originally targeted at communications similar to Grant Free communications, the method and the device provided in the present disclosure are also applicable to other communication structures, such as Grant-based communications and inter-base-station communications.

The present disclosure provides a method in a first node for wireless communication, comprising:
receiving a first signal set in a first radio resource pool by blind detection, and recovering a first bit block on a physical layer according to the first signal set;
delivering first buffer information from a physical layer to a higher layer; in instances when first condition set being fulfilled, triggering first information on the higher layer;
transmitting a first radio signal, the first radio signal comprising the first information;
herein, the first information is used to indicate an amount of data available for transmission in a buffer, and the first condition set comprises a first condition, the first condition comprising first buffer information being delivered from a physical layer to a higher layer.

In one embodiment, the above method allows the physical layer of a first node to start a request for channel allocation, thus avoiding processing of the higher layer of the first node over the first bit block; therefore, the relay latency can be shortened.

In one embodiment, the higher layer of a first node does not participate in the processing on the first bit block but is able to take into account the existence of the first bit block when determining whether to trigger the first information; on the one hand, such method reflects the current buffer status more accurately, on the other, it reduces the complexity of processing by the higher layer.

In one embodiment, transmission of the first signal set is performed based on a method similar to Grant Free, while retransmission of the first signal set, i.e., a second radio signal, is performed by the first node that has established a higher-layer connection; compared with retransmission performed by a transmitter of the first signal set, the above method can enhance the spectrum efficiency of retransmission.

In one embodiment, multiple receivers perform blind detections on the first signal set simultaneously, and the first node is one of these receivers; thus, the first signal set can be decoded with much higher chance of being correctly decoded than by merely one receiver; the method reduces the probability of retransmission by the transmitter of the first signal set, or a Modulation Coding Status (MCS) and power of the first signal set, which in turn improves transmission efficiency.

Specifically, according to one aspect of the present disclosure, the above method is characterized in comprising:
monitoring target information in a second radio resource pool to determine that the first bit block is not correctly decoded by a target receiver.

Specifically, according to one aspect of the present disclosure, the above method is characterized in that the first condition set comprises a second condition, the second condition comprising that there is no data available for transmission on all logical channels.

Specifically, according to one aspect of the present disclosure, the above method is characterized in that the first condition set comprises a third condition, and the first buffer information indicates a first priority, the third condition comprising: the first priority is higher than priority of any logical channel of all logical channel groups in which data for transmission is already available.

Specifically, according to one aspect of the present disclosure, the above method is characterized in that the first buffer information indicates a buffer size occupied by the first bit block.

Specifically, according to one aspect of the present disclosure, the above method is characterized in comprising:

before transmission of the first radio signal, when a second condition set is fulfilled, triggering second information;

herein, the second information is used for requesting channel resources; the second condition set comprises the first information not being cancelled and channel resources not being allocated.

Specifically, according to one aspect of the present disclosure, the above method is characterized in comprising:

in instances when a third condition set is fulfilled, indicating that the physical layer transmits second information and transmitting the second information;

the first receiver receiving a first signaling, the first signaling comprising scheduling information of the first radio signal;

herein, the third condition set comprises at least one channel resource available for the second information being configured to a current Transmission Time Interval (TTI).

Specifically, according to one aspect of the present disclosure, the above method is characterized in comprising:

receiving a second signaling; and transmitting a second radio signal;

herein, the second signaling comprises scheduling information of the second radio signal, and the first bit block is used for generating the second radio signal.

Specifically, according to one aspect of the present disclosure, the above method is characterized in that the first information is a Buffer Status Report.

The present disclosure provides a first node for wireless communication, comprising:

a first receiver: receiving a first signal set in a first radio resource pool by blind detection, and recovering a first bit block on a physical layer according to the first signal set;

a first processor: delivering first buffer information from a physical layer to a higher layer; in instances when first condition set being fulfilled, triggering first information on the higher layer;

a first transmitter: transmitting a first radio signal, the first radio signal comprising the first information;

herein, the first information is used to indicate an amount of data available for transmission in a buffer, and the first condition set comprises a first condition, the first condition comprising first buffer information being delivered from a physical layer to a higher layer.

The present disclosure provides a method in a second node for wireless communication, comprising:

performing blind detection in a first radio resource pool, and failing to correctly decode a first bit block; and receiving a first radio signal, the first radio signal comprising first information;

herein, the first bit block is used to generate a first signal set to be transmitted in the first radio resource pool; the first information is used to indicate an amount of data available for transmission in a buffer; when a first condition set is fulfilled, the first information is triggered on a higher layer; the first condition set comprises a first condition, the first condition comprising first buffer information being delivered from a physical layer to a higher layer; after triggering of the first information, the first radio signal is transmitted.

Specifically, according to one aspect of the present disclosure, the above method is characterized in comprising:

indicating by target information that the first bit block is not correctly decoded in a second radio resource pool.

Specifically, according to one aspect of the present disclosure, the above method is characterized in that the first condition set comprises a second condition, the second condition comprising that there is no data available for transmission on all logical channels.

Specifically, according to one aspect of the present disclosure, the above method is characterized in that the first condition set comprises a third condition, and the first buffer information indicates a first priority, the third condition comprising: the first priority is higher than priority of any logical channel of all logical channel groups in which data for transmission is already available.

Specifically, according to one aspect of the present disclosure, the above method is characterized in that the first buffer information indicates a buffer size occupied by the first bit block.

Specifically, according to one aspect of the present disclosure, the above method is characterized in that before transmission of the first radio signal, when a second condition set is fulfilled, second information is triggered, the second information being used for requesting channel resources; the second condition set comprises the first information not being cancelled and channel resources not being allocated.

Specifically, according to one aspect of the present disclosure, the above method is characterized in comprising:

in instances when a third condition set is fulfilled, receiving second information; and transmitting a first signaling, the first signaling comprising scheduling information of the first radio signal;

herein, when the third condition set is fulfilled, it is indicated that a physical layer is to transmit second information; the third condition set comprises at least one channel resource available for the second information being configured to the Transmission Time Interval (TTI).

Specifically, according to one aspect of the present disclosure, the above method is characterized in comprising:

a first transmitter: transmitting a second signaling; and the first receiver: receiving a second radio signal;

herein, the second signaling comprises scheduling information of the second radio signal, and the first bit block is used for generating the second radio signal.

Specifically, according to one aspect of the present disclosure, the above method is characterized in that the first information is a Buffer Status Report.

The present disclosure provides a second node for wireless communication, comprising:

a second receiver: performing blind detection in a first radio resource pool, and failing to correctly decode a first bit block; and receiving a first radio signal, the first radio signal comprising first information;

herein, the first bit block is used to generate a first signal set to be transmitted in the first radio resource pool; the first information is used to indicate an amount of data available for transmission in a buffer; when a first condition set is fulfilled, the first information is triggered on a higher layer; the first condition set comprises a first condition, the first condition comprising first buffer information being delivered from a physical layer to a higher layer; after triggering of the first information, the first radio signal is transmitted.

Compared with the prior art, the present disclosure is advantageous in the following aspects:
improving transmission efficiency, and reducing the complexity of the higher layer;
reducing transmission delay; and
reflecting the buffer status more accurately to ensure avoidance of buffer overflow.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
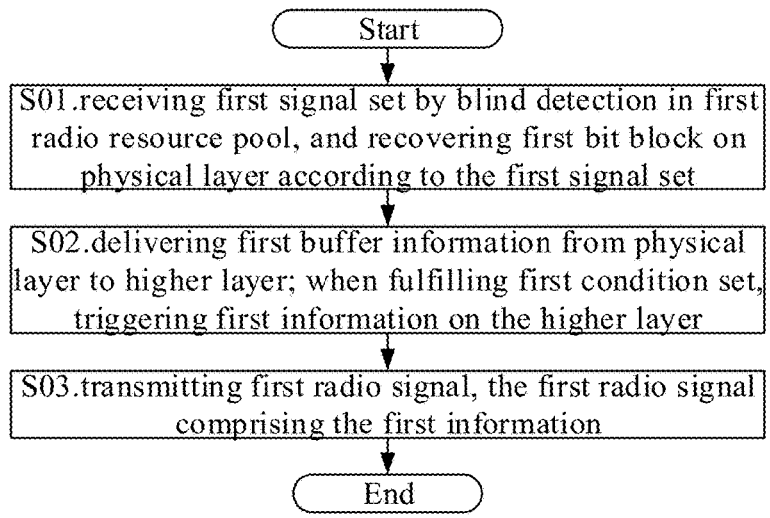
FIG. 1 illustrates a flowchart of processing of a first node according to one embodiment of the present disclosure.

Embodiment 1 illustrates a flowchart of processing of a first node, as shown in FIG. 1.

In Embodiment 1, the first node receives a first signal set by blind detection in a first radio resource pool and recovers a first bit block on a physical layer according to a first signal set in step S01; and delivers first buffer information from a physical layer to a higher layer in step S02; in instances when a first condition set is fulfilled, triggers first information on the higher layer; and transmits a first radio signal in step S03, the first radio signal comprising the first information.

In Embodiment 1, the first information is used to indicate an amount of data available for transmission in a buffer, the first condition set comprises a first condition, and the first condition comprising first buffer information being delivered from a physical layer to a higher layer.

In one embodiment, the first signal set comprises K radio signals, and the first bit block comprises K bit sub-blocks, the K bit sub-blocks are respectively used for generating the K radio signals, K being a positive integer greater than 1; the K radio signals are respectively transmitted by K transmitters.

In one subembodiment, the first signal set is transmitted in a physical layer channel.

In the above subembodiment, the first node retransmits data for K transmitters simultaneously, which further enhances the spectrum efficiency of small packet transmission.

In one embodiment, the first signal set is transmitted by a UE.

In one embodiment, the K transmitters are respectively K UEs.

In one embodiment, the first signal set is transmitted by a transmitter.

In one embodiment, the first information is used for requesting channel resources.

In one embodiment, the first information is a Buffer Status Report (BSR).

In one embodiment, bits comprised in the first bit block are not delivered to the higher layer.

In one embodiment, a target receiver of the first bit block does not include the first node.

In one embodiment, the first information indicates information of an amount of data available for transmission in an uplink buffer associated with a Media Access Control (MAC) Entity.

In one embodiment, the first information comprises Buffer Size.

In one embodiment, an identification (ID) of the target receiver is used for generating the first signal set.

In one embodiment, an ID of the target receiver is used for scrambling the first bit block.

In one embodiment, an ID of the target receiver is used for scrambling Cyclic Redundancy Check (CRC) in the first bit block.

In one embodiment, an ID of the target receiver is used for generating a DeModulation Reference Signal (DMRS) in the first signal set.

In one embodiment, the first radio signal is transmitted on a Physical Uplink Shared CHannel (PUSCH).

In one embodiment, the first radio signal is transmitted on a Physical Uplink Control CHannel (PUCCH).

In one embodiment, the first radio signal is transmitted on a Physical Sidelink Shared CHannel (PSSCH).

In one embodiment, the first node is a UE.

In one embodiment, the first node is a base station.

In one embodiment, the first node is a relay node.

In one embodiment, the first radio resource pool comprises a first time-frequency resource pool.

In one embodiment, the first radio resource pool occupies at least one multicarrier symbol in time domain and at least one subcarrier in frequency domain.

In one embodiment, the first radio resource pool occupies a plurality of Multiple Address (MA) Signatures in code domain.

In one embodiment, the multicarrier symbol is an Orthogonal Frequency Division Multiplexing (OFDM) symbol.

In one embodiment, the multicarrier symbol is a Single Carrier Frequency Division Multiplexing Access (SC-FDMA) symbol.

In one embodiment, the multicarrier symbol is a Filter Bank Multi-Carrier (FBMC) symbol.

In one embodiment, the first bit block comprises multiple bits.

In one embodiment, the first bit block comprises multiple sequentially arranged bits.

In one embodiment, the first signal set is transmitted on a PUSCH, by a UE.

In one embodiment, the first bit block is an output by the first signal set being sequentially through channel equalization, wideband symbol demodulation, de-resource element (RE)-mapping, de-layer mapping, de-scrambling and channel decoding.

In one embodiment, the first bit block is an output by the first signal set being sequentially through channel equalization, wideband symbol demodulation, de-RE-mapping, de-scrambling and channel decoding.

In one embodiment, the first bit block comprises K bit sub-blocks, and the first signal set comprises K radio signals; K is a positive integer greater than 1.

In one embodiment, the K bit sub-blocks are respectively obtained by the K radio signals being sequentially through channel equalization, wideband symbol demodulation, de-RE-mapping, de-layer mapping, de-scrambling and channel decoding.

In one embodiment, the K bit sub-blocks are respectively obtained by the K radio signals being sequentially through channel equalization, wideband symbol demodulation, de-RE-mapping, de-scrambling and channel decoding.

In one embodiment, channel coding corresponding to the channel decoding is based on polar coding.

In one embodiment, channel coding corresponding to the channel decoding is based on Low Density Parity Check (LDPC) coding.

In one embodiment, the K radio signals are respectively transmitted on K PUSCHs.

In one embodiment, the first bit block is formed by concatenation of the K bit sub-blocks in sequence.

In one embodiment, the first bit block indicates K.

In one embodiment, the first bit block indicates the K transmitters.

In one embodiment, the first bit block comprises K IDs, the K IDs respectively identifying the K transmitters.

In one embodiment, the first information comprises the K IDs.

In one embodiment, the first information indicates a buffer size occupied by the first bit block.

In one embodiment, the first information indicates a number of bits comprised by the first bit block.

In one embodiment, each of the K IDs comprises E1 bits, E1 being a positive integer greater than 1.

In one embodiment, E1 is 8.

In one embodiment, the K IDs are respectively K Radio Network Temporary Identifiers (RNTI).

In one embodiment, the phrase of receiving a first signal set in a first radio resource pool by blind detection comprises that the first signal set is Grant Free.

In one embodiment, the phrase of receiving a first signal set in a first radio resource pool by blind detection comprises that there isn't a higher-layer connection between a target receiver receiving the first signal set and a transmitter transmitting the first signal set.

In one embodiment, the phrase of receiving a first signal set in a first radio resource pool by blind detection comprises that there isn't a higher-layer connection between the first node and a transmitter transmitting the first signal set.

In one embodiment, the higher-layer connection comprises a Radio Resource Control (RRC) layer connection.

In one embodiment, the higher-layer connection comprises a Non Access System (NAS) connection.

In one embodiment, the higher-layer connection comprises an application layer connection.

In one embodiment, the phrase of receiving a first signal set in a first radio resource pool by blind detection comprises that before correctly decoding the first signal set, the first node is incapable of determining whether the first signal set is to be transmitted in the first radio resource pool.

In one embodiment, the phrase of receiving a first signal set in a first radio resource pool by blind detection comprises that the first node performs Q channel decodings in the first radio resource pool, Q being a positive integer greater than 1. Each of the Q channel decodings comprises: determining according to CRC whether a corresponding radio signal is correctly received; the first signal set comprises Q1 radio signals, and the Q1 radio signals are correctly received by Q1 channel decodings of the Q channel decodings, respectively, Q1 being a positive integer no greater than Q.

In one embodiment, all the Q channel decodings are based on Viterbi algorithm.

In one embodiment, each of the Q channel decodings is based on iteration.

In one embodiment, all the Q channel decodings are based on belief propagation (BP) algorithm.

In one embodiment, all the Q channel decodings are based on Log Likelyhood Ratio (LLR)-BP algorithm.

In one embodiment, the phrase of receiving a first signal set in a first radio resource pool by blind detection comprises that the first signal set comprises Q1 radio signals, and the first node performs Q characteristic sequence detections in the first radio resource pool, Q being a positive integer greater than 1. Each of the Q characteristic sequence detections comprises determining whether a corresponding radio signal is transmitted according to coherent detection on sequences, and Q1 characteristic sequence detections of the Q characteristic sequence detections are respectively used to determine that the Q1 radio signals are transmitted, Q1 being a positive integer no greater than Q.

In one embodiment, the physical layer is Layer 1 (L1).

In one embodiment, the physical layer is PHY.

In one embodiment, the first information is a Buffer Status Report.

In one embodiment, the Buffer Status Report is a Regular BSR.

In one embodiment, the Buffer Status Report is a Padding BSR.

In one embodiment, the first condition set comprises a second condition, the second condition comprising that there is no data available for transmission on all logical channels.

In one embodiment, the first condition set comprises a third condition, and the first buffer information indicates a first priority, the third condition comprising: the first priority is higher than priority of any logical channel of all logical channel groups in which data for transmission is already available.

In one embodiment, the first buffer information indicates a buffer size occupied by the first bit block.

Embodiment 2

Figure 2:
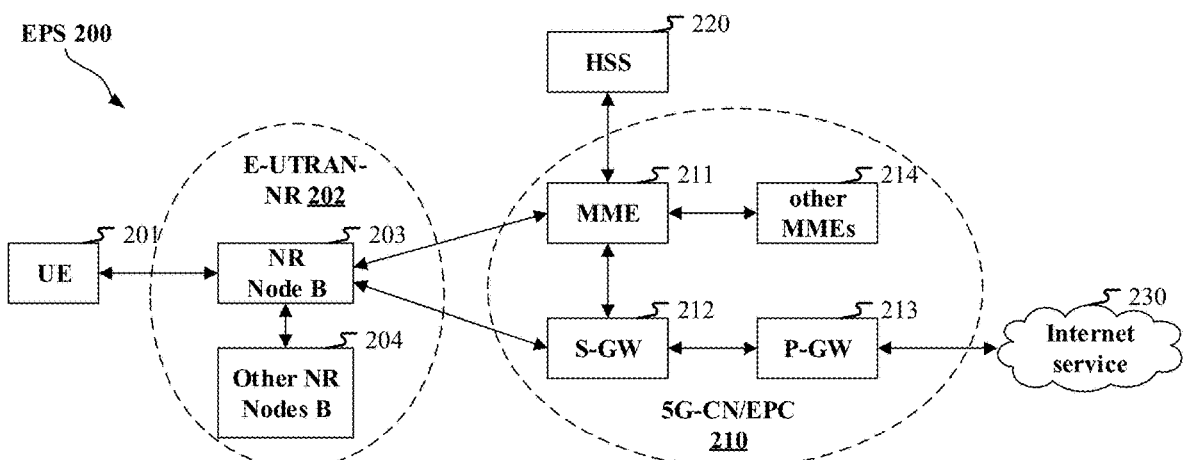
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE may be called an Evolved Packet System (EPS) 200. The EPS 200 may comprise one or more UEs 201, an E-UTRAN-NR 202, a 5G-CoreNetwork/Evolved Packet Core (5G-CN/EPC) 210, a Home Subscriber Server (HSS) 220 and an Internet Service 230. Herein, the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises a New Radio (NR) node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5G-CN/EPC 210 via an S1 interface. The 5G-CN/EPC 210 comprises a Mobility Management Entity (MME) 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the first node in the present disclosure is a UE 201, and the second node in the present disclosure is the gNB 203.

In one subembodiment, a transmitter of each radio signal in the first signal set in the present disclosure is a UE 201.

In one embodiment, the first node and the second node in the present disclosure are UEs 201 respectively, and a transmitter of each radio signal in the first signal set in the present disclosure is a UE 201.

In one subembodiment, the first node supports V2X communications.

In one embodiment, the UE 201 supports V2X communications.

In one embodiment, the gNB 203 supports V2X communications.

Embodiment 3

Figure 3:
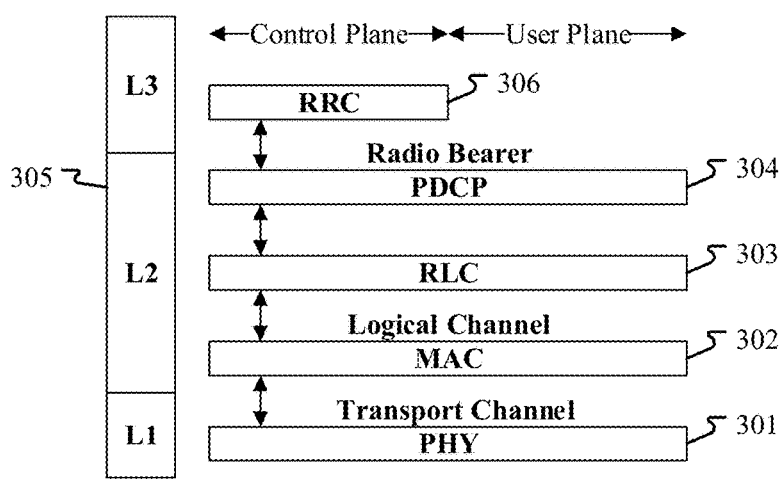
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) cancelled at a P-GW 213 of the network side and an application layer cancelled at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the L2 305 belongs to a higher layer.

In one embodiment, the RRC sublayer 306 in the L3 belongs to a higher layer.

In one embodiment, a channel between the PHY 301 and the MAC sublayer 302 is a transport channel.

In one embodiment, a channel between the RLC sublayer 303 and the MAC sublayer 302 is a logical channel.

Embodiment 4

Figure 4:
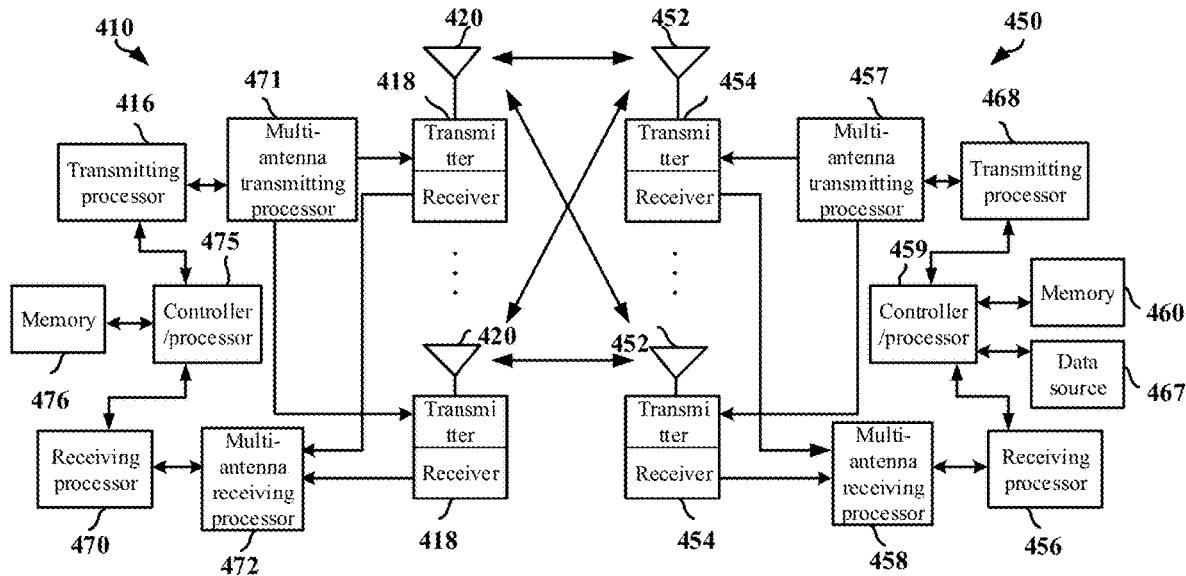
FIG. 4 illustrates a schematic diagram of two communication devices in communication according to one embodiment of the present disclosure.

Embodiment 4 illustrates a schematic diagram of two communication devices in communication, as shown in FIG. 4. FIG. 4 is a block diagram illustrating a node 410 and a node 450 that are in communication with each other in access network.

The node 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The node 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a link from the node 410 to the node 450, at the node 410, a higher-layer packet is provided to the controller/processor 475. The controller/processor 475 provides functions of the L2 layer. The transmitting processor 416 and the multi-antenna transmitting processor 471 perform signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding/beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a link from the node 410 to the node 450, at the node 450, each receiver 454 receives a signal via a corresponding antenna 452. Each receiver 454 recovers information modulated onto the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any node 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the node 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. The controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In one embodiment, the memory 460 is used for buffer of data to be transmitted.

In one embodiment, the memory 460 is used for buffer of received data.

In one embodiment, the memory 460 is used for buffer of the first bit block.

In one embodiment, the memory 476 is used for buffer of data to be transmitted.

In one embodiment, the memory 476 is used for buffer of received data.

In one embodiment, the memory 476 is used for buffer of the first bit block.

In one embodiment, the data to be transmitted is transmitted on an UpLink Shared CHannel (UL-SCH).

In one embodiment, the received data is transmitted on a DownLink Shared CHannel (DL-SCH).

In one embodiment, a space occupied by a bit block in the memory 460 is called a buffer size of the bit block.

In one embodiment, a smallest space of multiple candidate spaces no smaller than a space occupied by a bit block in the memory 460 is called a buffer size of the bit block.

In one embodiment, any two of the multiple candidate spaces are of different sizes.

In one embodiment, in the link from the node 410 to the node 450, the controller/processor 475 is also in charge of HARQ operation, retransmission of a lost packet and a signaling to the node 450. The controller/processor 459 is also in charge of using ACK and/or NACK protocols for error detection as a way to support HARQ operation.

In one embodiment, in the link from the node 410 to the node 450, the controller/processor 475 provides header compression, encryption, packet segmentation and reordering, and multiplexing between a logical channel and a transport channel, and radio resources allocation for a node 450 based on various priorities. The controller/processor 459 performs de-multiplexing between a transport channel and a logical channel, packet reassembling, decryption and header de-compression, control signal processing based on radio resource allocation for the controller/processor 475 so as to recover a higher-layer packet.

In one embodiment, in the link from the node 410 to the node 450, the controller/processor 475 performs header compression, encryption, packet segmentation and reordering as well as multiplexing between a logical channel and a transport channel based on radio resource allocation for the controller/processor 459.

In one embodiment, in the link from the node 410 to the node 450, the controller/processor 475 implements the functionality of the L2 used for the user plane and the control plane.

In one embodiment, in the link from the node 410 to the node 450, the controller/processor 459 implements the functionality of the L2 used for the user plane and the control plane.

In one embodiment, in a link from the node 450 to the node 410, transmission steps implemented in the link from the node 410 to the node 450 will be re-applied—except for that the functions of modules in the node 410 are completed by corresponding modules in the node 450 and that the functions of modules in the node 450 are completed by corresponding modules in the node 410.

In one embodiment, the node 410 is a first node; the node 420 is a second node.

In one embodiment, the node 410 is a base station, the controller/processor 475 provides header compression, encryption, packet segmentation and reordering, multiplexing between a logical channel and a transport channel as well as radio resources allocation for the node 450 based on various priorities. The controller/processor 475 is responsible for HARQ operation, retransmission of a lost packet and a signaling to the node 450.

In one subembodiment, the node 450 is a UE, the first node being the node 450; and the node 410 is a second node.

In one embodiment, the node 450 is a UE, a first node employs hardcore structures in the node 450, and a transmitter of any radio signal of the first signal set also employs the hardcore structures in the node 450.

In one subembodiment, the antenna 452, the receiver 454 and the receiving processor 456 are used for receiving a first signal set by blind detection in a first radio resource pool and recovering a first bit block on the physical layer according to the first signal set; the antenna 452, the transmitter 454 and the transmitting processor 468 are used for transmitting a first radio signal.

In one subembodiment, the multi-antenna receiving processor 458 is used for receiving a first signal set, while the multi-antenna transmitting processor 457 is used for transmitting a first radio signal.

In one embodiment, the antenna 452, the transmitter 454 and the transmitting processor 468 are used for transmitting a first signal set.

In one embodiment, the antenna 420, the receiver 418 and the receiving processor 470 are used for receiving a first signal set and a first radio signal.

In one embodiment, the antenna 420, the transmitter 418 and the transmitting processor 416 are used for transmitting a first signaling, while the antenna 452, the receiver 454 and the receiving processor 456 are used for receiving a first signaling.

In one subembodiment, the multi-antenna receiving processor 458 is used for receiving a first signaling, while the multi-antenna transmitting processor 471 is used for transmitting a first signaling.

In one embodiment, the node 410 comprises at least one processor and at least one memory. The at least one memory includes computer program codes. The at least one memory and the computer program codes are configured to be used in collaboration with the at least one processor. The node 410 at least performs blind detection in a first radio resource pool, and fails to correctly decode a first bit block; and receives a first radio signal, the first radio signal comprising first information; herein, the first bit block is used to generate a first signal set to be transmitted in the first radio resource pool; the first information is used to indicate an amount of data available for transmission in a buffer; when a first condition set is fulfilled, the first information is triggered on a higher layer; the first condition set comprises a first condition, the first condition comprising first buffer information being delivered from a physical layer to a higher layer; the first radio signal is transmitted.

In one embodiment, the node 450 comprises at least one processor and at least one memory. The at least one memory includes computer program codes. The at least one memory and the computer program codes are configured to be used in collaboration with the at least one processor. The node 450 at least receives a first signal set in a first radio resource pool by blind detection, and recovers a first bit block on a physical layer according to the first signal set; delivers first buffer information from a physical layer to a higher layer; in instances when first condition set being fulfilled, triggers first information on the higher layer; transmits a first radio signal, the first radio signal comprising the first information; herein, the first information is used to indicate an amount of data available for transmission in a buffer, and the first condition set comprises a first condition, the first condition comprising first buffer information being delivered from a physical layer to a higher layer.

In one embodiment, the node 410 comprises a memory that stores computer readable instruction program, the computer readable instruction program generates actions when executed by at least one processor, which include: performing blind detection in a first radio resource pool, and failing to correctly decode a first bit block; and receiving a first radio signal, the first radio signal comprising first information; herein, the first bit block is used to generate a first signal set to be transmitted in the first radio resource pool; the first information is used to indicate an amount of data available for transmission in a buffer; when a first condition set is fulfilled, the first information is triggered on a higher layer; the first condition set comprises a first condition, the first condition comprising first buffer information being delivered from a physical layer to a higher layer; the first radio signal is transmitted.

In one embodiment, the node 450 comprises a memory that stores computer readable instruction program, the computer readable instruction program generates actions when executed by at least one processor, which include: receiving a first signal set in a first radio resource pool by blind detection, and recovering a first bit block on a physical layer according to the first signal set; delivering first buffer information from a physical layer to a higher layer; in instances when first condition set being fulfilled, triggering first information on the higher layer; transmitting a first radio signal, the first radio signal comprising the first information; herein, the first information is used to indicate an amount of data available for transmission in a buffer, and the first condition set comprises a first condition, the first condition comprising first buffer information being delivered from a physical layer to a higher layer.

In one embodiment, the node 410 and the node 450 are UEs, respectively.

In one embodiment, the node 410 and the node 450 are base stations, respectively.

In one embodiment, the node 410 and the node 450 are a base station and a UE, respectively.

Embodiment 5

Figure 5:
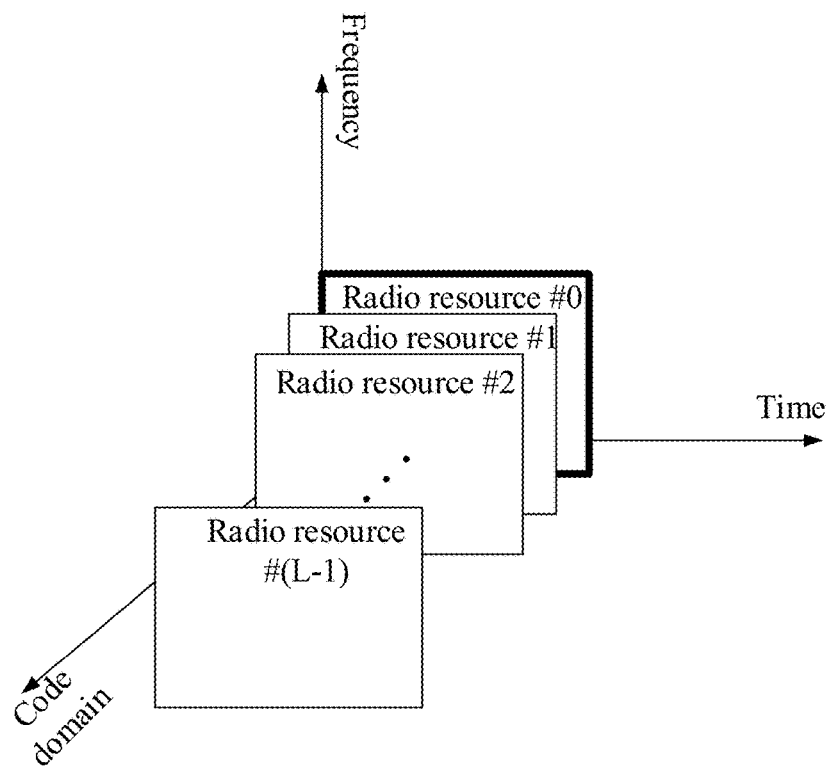
FIG. 5 illustrates a schematic diagram of a radio resource pool according to one embodiment of the present disclosure.

Embodiment 5 illustrates a schematic diagram of a radio resource pool, as shown in FIG. 5.

In Embodiment 5, the radio resource pool comprises L radio resources, namely, radio resource #0, radio resource #1 . . . , and radio resource #(L−1), L being a positive integer greater than 1; time-frequency resources occupied by the L radio resources are the same, as depicted by the box framed with thick solid lines; the radio resources #0, #1 . . . and #(L−1) respectively correspond to L different code-domain resources, i.e., MA Signatures.

In one embodiment, a first radio resource pool is the radio resource pool.

In one embodiment, a second radio resource pool is the radio resource pool.

In one embodiment, the time-frequency resources occupied by the L radio resources comprise multiple Resource Elements (REs).

In one embodiment, the time-frequency resources occupied by the L radio resources last no longer than 1 ms in time domain.

In one embodiment, a first signal set comprises K radio signals, K being a positive integer greater than 1, and the K radio signals are respectively transmitted in K radio resources of the L radio resources.

Embodiment 6

Figure 6:
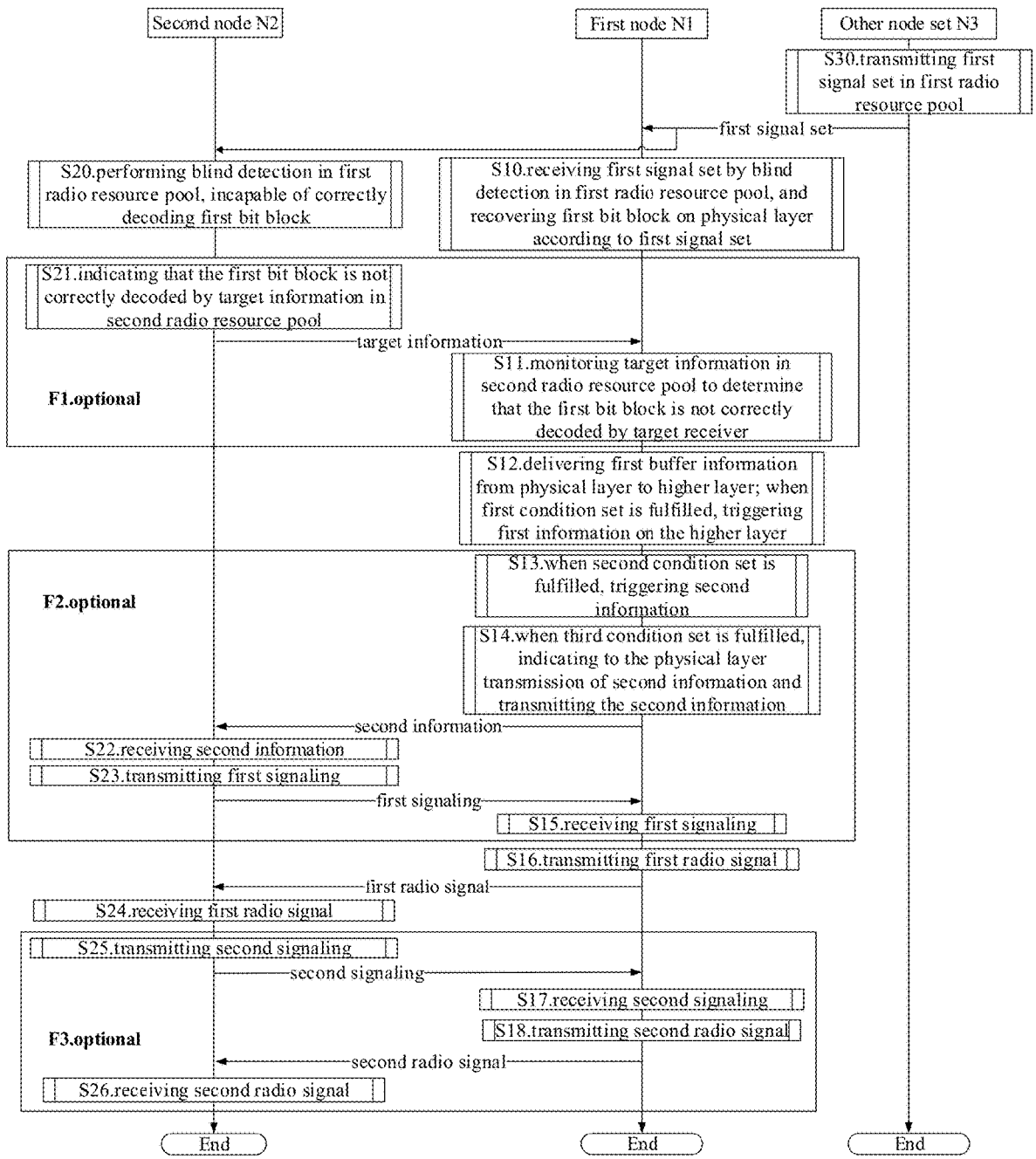
FIG. 6 illustrates a flowchart of transmission of a first radio signal according to one embodiment of the present disclosure.

Embodiment 6 illustrates a flowchart of transmission of a first radio signal, as shown in FIG. 6. In FIG. 6, steps marked by the box F1, the box F2 and the box F3 are optional, respectively.

The first node N1 receives a first signal set in a first radio resource pool by blind detection, and recovers a first bit block on a physical layer according to the first signal set in step S10; monitors target information in a second radio resource pool to determine that the first bit block is not correctly decoded by a target receiver in step S11; delivers first buffer information from a physical layer of the first node N1 to a higher layer of the first node N1 in step S12; in instances when first condition set is fulfilled, triggers first information on the higher layer; when a second condition set is fulfilled, triggers second information before transmission of the first radio signal in step S13; in instances when a third condition set is fulfilled, indicates that the physical layer of the first node N1 transmits second information and then transmits the second information in step S14; and receives a first signaling in step S15, the first signaling comprising scheduling information of the first radio signal; transmits a first radio signal in step S16, the first radio signal comprising the first information; receives a second signaling in step S17; and transmits a second radio signal in step S18.

The second node N2 performs blind detection in a first radio resource pool and fails to correctly decode a first bit block in step S20; indicates by target information that the first bit block is not correctly decoded in a second radio resource pool in step S21; in instances when a third condition set is fulfilled, receives the second information in step S22; and transmits the first signaling in step S23; receives the first radio signal in step S24; transmits the second signaling in step S25; and receives the second radio signal in step S26.

The other node set N3 transmits a first signal set in a first radio resource pool in step S30.

In Embodiment 6, the first information is used to indicate an amount of data available for transmission in a buffer, and the first condition set comprises a first condition, the first condition comprising first buffer information being delivered from a physical layer of the first node N1 to a higher layer of the first node N1; the second information is used for requesting channel resources; the second condition set comprises the first information not being cancelled and channel resources not being allocated; the third condition set comprises at least one channel resource available for the second information being configured to the Transmission Time Interval (TTI); the second signaling comprises scheduling information of the second radio signal, and the first bit block is used for generating the second radio signal.

In one embodiment, the second information is used by the second node N2 for triggering transmission of the first signaling.

In one embodiment, the second information is triggered on a higher layer of the first node N1.

In one embodiment, the scheduling information comprises a Modulation Coding Status (MCS).

In one embodiment, the scheduling information comprises a Redundancy Version (RV).

In one embodiment, the scheduling information comprises a Hybrid Auto Repeat reQuest (HARQ) Process Number.

In one embodiment, the scheduling information comprises a New Data Indicator (NDI).

In one embodiment, the scheduling information comprises a HARQ process number, an RV, an NDI and an MCS.

In one embodiment, the scheduling information comprises a transmission antenna port.

In one embodiment, the scheduling information comprises a Transmission Configuration Indicator (TCI).

In one embodiment, the scheduling information comprises Transmit Power Control (TPC).

In one embodiment, a target signaling is Downlink Control Information (DCI).

In one embodiment, a target signaling is transmitted in a Physical Downlink Control CHannel (PDCCH).

In one embodiment, a target signaling is DCI used for Uplink Grant.

In one subembodiment, the first radio signal is a Physical Uplink Shared CHannel (PUSCH).

In one subembodiment, the target signaling comprises some or all fields in Long Term Evolution (LTE) DCI Format 0.

In one subembodiment, the target signaling comprises some or all fields in LTE DCI Format 4.

In one subembodiment, the target signaling is DCI with NR Format 0_0.

In one subembodiment, the target signaling is DCI with NR DCI Format 0_1.

In one embodiment, the target signaling is a first signaling.

In one embodiment, the target signaling is a second signaling.

In one embodiment, the phrase of failing to correctly decode a first bit block comprises that the first signal set is not correctly decoded by the second node N2.

In one embodiment, the phrase of failing to correctly decode a first bit block comprises that any radio signal in the first signal set is not correctly decoded by the second node N2.

In one embodiment, the phrase of failing to correctly decode a first bit block comprises that any radio signal in the first signal set fails to pass CRC check performed by the second node N2 in channel decoding.

In one embodiment, the phrase of failing to correctly decode a first bit block comprises that the second node N2 fails to be aware of the existence of any radio signal in the first signal set through characteristic sequence detection.

In one embodiment, the second node N2 is a target receiver of the first signal set.

In one embodiment, the second node N2 maintains a serving cell of the first node N1.

In one embodiment, an identification of the second node N2 is used for generation of any radio signal in the first signal set.

In one embodiment, an identification of the second node N2 is used for scrambling of CRC comprised by any radio signal in the first signal set.

In one embodiment, an identification of the second node N2 is used for generation of an RS sequence of DMRS comprised by any radio signal in the first signal set.

In one embodiment, the first radio resource pool is allocated by the second node N2.

In one embodiment, the target information is broadcast.

In one embodiment, the target information is transmitted in a PDCCH.

In one embodiment, when and only when all conditions in a condition set are fulfilled will the condition set be fulfilled.

In one embodiment, the condition set is a first condition set.

In one embodiment, the condition set is a second condition set.

In one embodiment, the condition set is a third condition set.

In one embodiment, the first bit block is used for generating the second radio signal, and the second radio signal is transmitted on a first channel, and the scheduling information of the second radio signal is information of allocation of the first channel.

In one embodiment, the first channel is allocated to the first node N1 (by the second node N2).

In one embodiment, an identification of the first node N1 is used for scrambling bit blocks transmitted on the first channel.

In one embodiment, an identification of the first node is used for scrambling CRC of bit blocks transmitted on the first channel.

In one embodiment, the first channel is dedicated to the first node.

In one embodiment, the first buffer information indicates a number of information bits in the first signal set.

In one embodiment, the first buffer information indicates a number of bits comprised by the first bit block.

In one embodiment, the first node N1 is a UE, the second node N2 is a base station, and the other node set N3 comprises at least one UE.

In one embodiment, the first node N1 is a UE, the second node N2 is a UE, and the other node set N3 comprises at least one UE.

In one embodiment, the first signal set comprises K radio signals, K being a positive integer greater than 1; the other node set N3 comprises K UEs, and the K radio signals are respectively transmitted by the K UEs.

In one embodiment, the first buffer information indicates the K.

In one embodiment, buffers occupied by the K radio signals are of a same size.

In one embodiment, there is no higher-layer connection between any one of the K UEs and the first node, there is no higher-layer connection between any one of the K UEs and the second node, and there is a higher-layer connection between the first node and the second node.

In one embodiment, the higher-layer connection comprises RRC connection.

In one embodiment, the higher-layer connection comprises core network connection.

In one embodiment, time-frequency resources occupied by the K radio signals are the same.

In one embodiment, the K radio signals respectively occupy K physical layer channels.

In one embodiment, the target information comprises indication information of all radio signals correctly decoded by the second node N2 in the first radio resource pool, and the target information does not comprise indication information of any radio signal in the first signal set.

In one embodiment, the indication information comprises a HARQ-ACK.

In one embodiment, the target information comprises indication information of a radio signal incorrectly decoded by the second node N2 in the first radio resource pool, and the target information comprises indication information of each radio signal in the first signal set.

In one embodiment, the second radio resource pool is associated with the first radio resource pool.

In one embodiment, time-frequency resources occupied by the first radio resource pool are used to determine time-frequency resources occupied by the second radio resource pool.

In one embodiment, the first node N1 performs channel decoding on the first signal set to obtain the first bit block, and performs channel coding on the first bit block to generate the second radio signal, a code rate employed by the channel coding being indicated by the first physical layer signaling.

In one embodiment, the K radio signals are respectively transmitted by K transmitters, the phrase of receiving a first signal set in a first radio resource pool by blind detection comprises that there is no higher-layer connection between any of the K transmitters and a transmitter of the first signal subset.

In one embodiment, the K radio signals are respectively transmitted by K transmitters, the phrase of receiving a first signal set in a first radio resource pool by blind detection comprises that there is no higher-layer connection between the first node and any of the K transmitters.

In one embodiment, the first information and the second information are a Buffer Status Report (BSR) and a Scheduling Request (SR), respectively.

In one embodiment, the first bit block is through scrambling.

In one subembodiment, the scrambling is executed on a physical layer of a transmitter of the first signal set.

In one embodiment, the first channel is a short Physical Uplink Shared Channel (sPUSCH).

In one embodiment, the first channel is a physical layer channel.

In one embodiment, the first channel is dedicated to the first node.

In one embodiment, the third condition set comprises the second information being triggered.

In one embodiment, this TTI does not belong to a measurement gap.

In one embodiment, the first node is capable of wireless transmission in this TTI.

In one embodiment, the second condition set comprises a first timer not being running.

In one embodiment, the second condition set comprises a first timer being smaller than a specific threshold, the specific threshold being a positive integer.

In one embodiment, the specific threshold is greater than 1.

In one embodiment, the specific threshold is configurable.

In one embodiment, when the first timer is no smaller than the specific threshold, the first node restarts cell searching.

In one embodiment, the first timer is SR COUNTER.

In one embodiment, after the first processor indicated that the physical layer transmits second information, the first timer is started.

In one embodiment, the first information is used for generating scheduling information in the second signaling.

In one embodiment, the first information is used for generating a number of REs occupied by the second radio signal.

In one embodiment, the second condition set comprises the first information being triggered on the higher layer.

In one embodiment, the third condition set comprises the second information being triggered.

In one embodiment, the first information is a Buffer Status Report.

In one embodiment, the Buffer Status Report is a Regular BSR.

In one embodiment, the Buffer Status Report is a Padding BSR.

Embodiment 7

Figure 7:
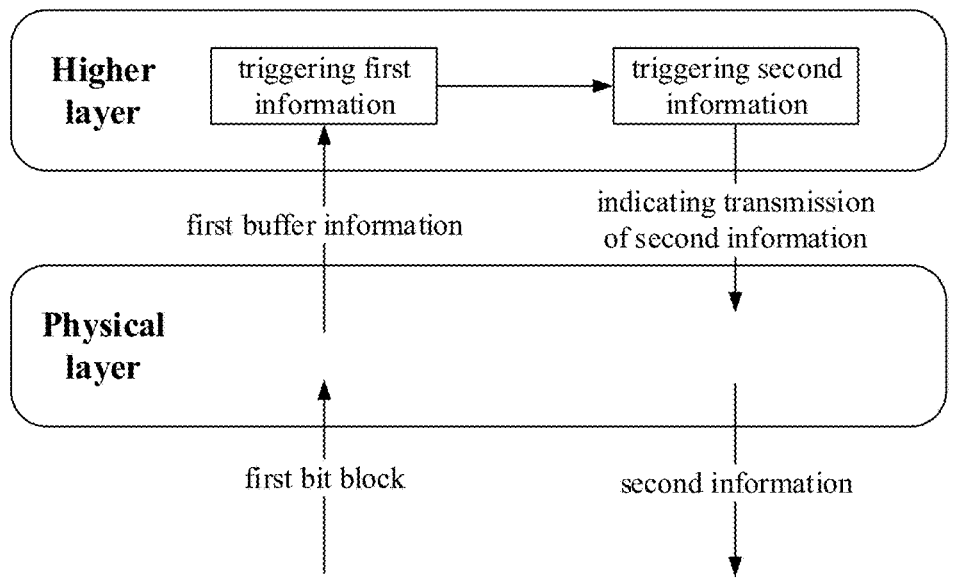
FIG. 7 illustrates a schematic diagram of requesting channel allocations according to one embodiment of the present disclosure.

Embodiment 7 illustrates a schematic diagram of requesting channel allocations, as shown in FIG. 7; the physical layer and the higher layer illustrated by FIG. 7 are on the first node side.

In Embodiment 7, a first node recovers a first bit block according to a first signal set on the physical layer and determines first buffer information according to a buffer size occupied by the first bit block; delivers the first buffer information to the higher layer; in instances when a first condition set is fulfilled, triggers first information on the higher layer, the first condition set comprising a first condition, the first condition comprising first buffer information being delivered from the physical layer to the higher layer; in instances when a second condition set is fulfilled, the higher layer triggers second information, the second condition set comprising the first information being triggered on the higher layer and the first information not being cancelled as well as channel resources not being allocated; in instances when a third condition set is fulfilled, the higher layer indicates that the physical layer transmits second information and the physical layer transmits the second information.

In Embodiment 7, the second information is used for requesting channel resources, the third condition set comprises at least one channel resource available for the second information being configured to the present Transmission Time Interval (TTI), the third condition set comprising the second information being triggered.

In one embodiment, the action of requesting channel resources includes requesting UL-SCH resources.

In one embodiment, the second information is a Scheduling Request.

In one embodiment, the second information is used for requesting channel resources for new transmission.

In one embodiment, the phrase of channel resources not being allocated comprises that during the Transport Time Interval (TTI) a MAC entity in the higher layer is not allocated with uplink resources used for new transmission.

In one embodiment, the uplink resources comprise a transport channel.

In one embodiment, the uplink resources comprise a logical channel.

In one embodiment, the phrase of channel resources not being allocated comprises not being configured with Uplink Grant.

In one embodiment, the second condition set comprises a first timer not being running.

In one embodiment, the first timer is maintained by the higher layer.

In one embodiment, the first timer is used for interrupting transmission of the second information.

In one embodiment, the first timer is a logicalChannelSR-ProhibitTimer.

In one embodiment, the physical layer of the first node transmits first buffer information to the higher layer of the first node, and the first buffer information is used by the higher layer of the first node for determining a buffer size occupied by the first signal set.

In one embodiment, the first buffer information indicates a number of information bits in the first signal set.

In one embodiment, the first buffer information indicates a number of bits comprised by the first bit block.

In one embodiment, the first buffer information indicates a number of bits obtained by channel decoding of the first signal set.

In one embodiment, the first signal set occupies K radio resources, and the K radio resources respectively comprise K MA Signatures, and the first buffer information indicates K, K being a positive integer greater than 1.

In one embodiment, the higher layer of the first node comprises a Medium Access Control (MAC) layer of the first node.

In one embodiment, the higher layer of the first node comprises a Radio Link Control (RLC) layer of the first node.

In one embodiment, the higher layer of the first node comprises a Packet Data Convergence Protocol (PDCP) layer of the first node.

In one embodiment, the first condition set comprises a third condition, and the first buffer information indicates a first priority, and the third condition comprising: the first priority is higher than priority of any logical channel of all logical channel groups in which data for transmission is already available.

In one embodiment, the first priority is a positive integer.

In one embodiment, the first priority is a candidate priority in a candidate priority set, the candidate priority set being made up of all priorities of potentially allocated logical channels.

In one embodiment, the first priority is configured by a base station.

In one embodiment, the first priority is configured by a serving cell of the first node.

In one embodiment, the first priority is associated with the first radio resource pool.

Embodiment 8

Figure 8:
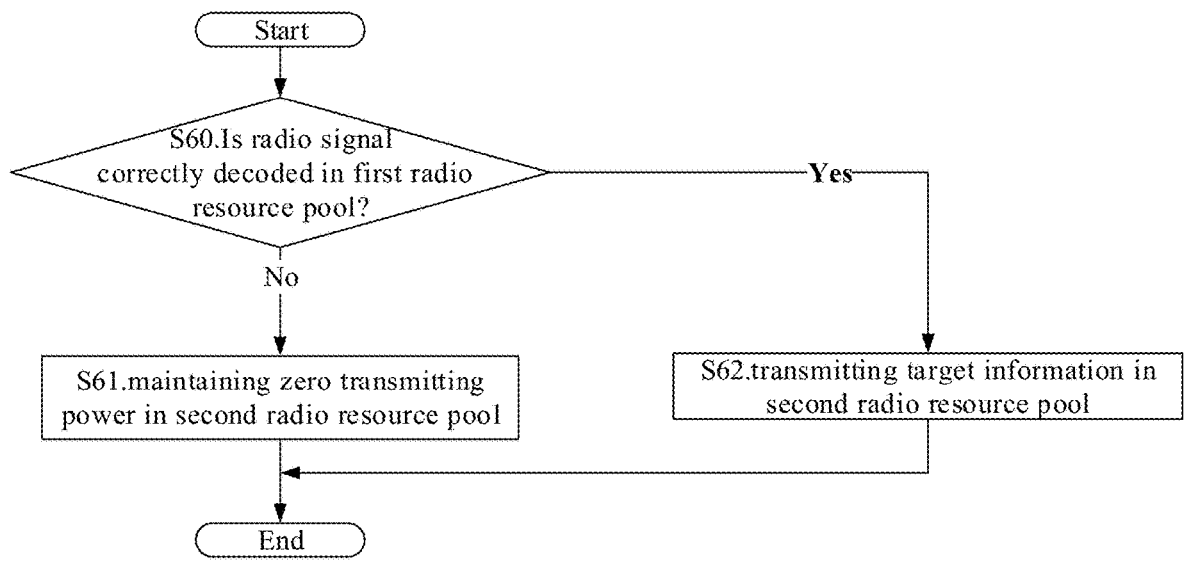
FIG. 8 illustrates a schematic diagram of indicating that a first signal set is not correctly decoded by target information according to one embodiment of the present disclosure.

Embodiment 8 illustrates a schematic diagram of indicating that a first signal set is not correctly decoded by target information, as shown in FIG. 8. Steps in FIG. 8 are implemented in the second node.

In step S60, the second node determines whether there is a radio signal that is correctly decoded in a first radio resource pool; if yes, transmit target information in a second radio resource pool in step S62, if not, maintain zero-transmitting-power in a second radio resource pool in step S61.

In one embodiment, in the step S61, target information is set to null.

In one embodiment, radio signal(s) correctly decoded by the second node in the first radio resource pool comprises (comprise) M radio signal(s), M being a positive integer; the target information comprises M ID(s), and the M ID(s) is (are respectively) used for identifying the M radio signal(s).

In one embodiment, none of the M radio signal(s) belongs to the first signal set.

In one embodiment, M ID(s) is (are respectively) used for identifying transmitter(s) of the M radio signal(s).

In one embodiment, M ID(s) is (are respectively) used for scrambling of the M radio signal(s).

In one embodiment, M ID(s) is (are respectively) used for generating RS sequence(s) of DMRS comprised by the M radio signal(s).

In one embodiment, M ID(s) is (are respectively) M RNTI(s).

Embodiment 9

Figure 9:
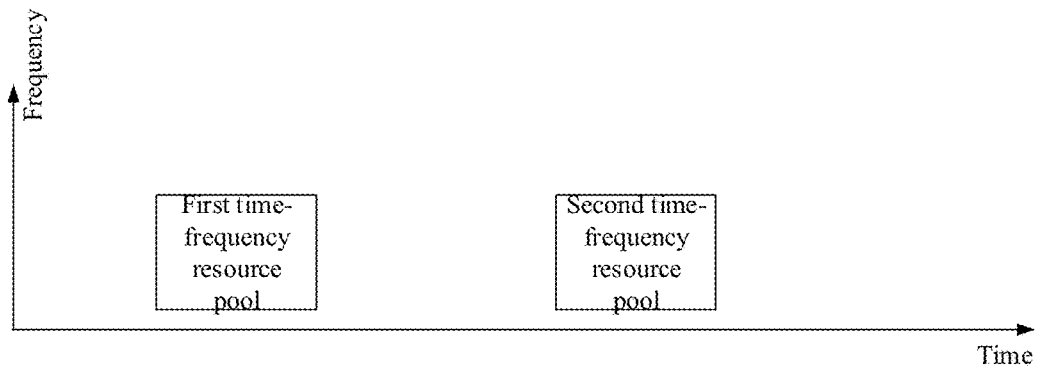
FIG. 9 illustrates a schematic diagram of a first time-frequency resource pool and a second time-frequency resource pool according to one embodiment of the present disclosure.

Embodiment 9 illustrates a schematic diagram of a first time-frequency resource pool and a second time-frequency resource pool, as shown in FIG. 9.

In Embodiment 9, time-domain resources occupied by the second time-frequency resource pool are after time-domain resources occupied by the first time-frequency resource pool.

In one embodiment, frequency-domain resources occupied by the second time-frequency resource pool and frequency-domain resources occupied by the first time-frequency resource pool belong to a same BandWidth Part (BWP).

In one embodiment, frequency-domain resources occupied by the second time-frequency resource pool and frequency-domain resources occupied by the first time-frequency resource pool comprise a same subcarrier.

In one embodiment, a slot occupied by the second time-frequency resource pool is a u-th slot subsequent to a slot occupied by the first time-frequency resource pool, u being a positive integer.

In one embodiment, the u is a fixed constant.

In one embodiment, the u is configurable.

In one embodiment, a first time-frequency resource pool and a second time-frequency resource pool are respectively time-frequency resources occupied by a first radio resource pool and a second radio resource pool.

In one embodiment, a first time-frequency resource pool and a second time-frequency resource pool are respectively time-frequency resources occupied by a first radio resource pool and a first channel.

In one embodiment, a first time-frequency resource pool and a second time-frequency resource pool are respectively time-frequency resources occupied by a first signaling and the first radio signal, u being indicated by the first physical layer signaling.

In one embodiment, a first time-frequency resource pool and a second time-frequency resource pool are respectively time-frequency resources occupied by a second signaling and the second radio signal, u being indicated by the second physical layer signaling.

In one embodiment, the second radio resource pool is associated with the first radio resource pool.

Embodiment 10

Figure 10:
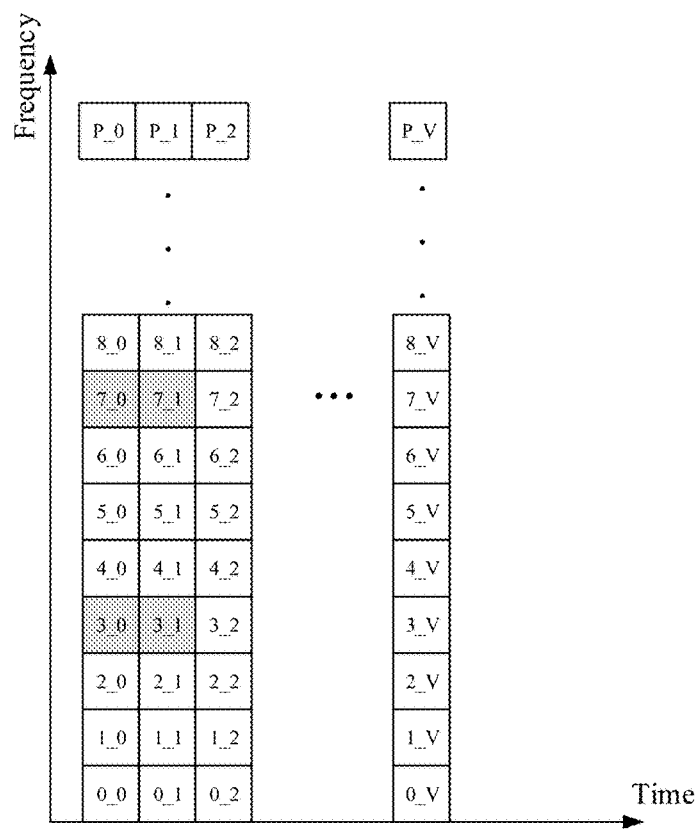
FIG. 10 illustrates a schematic diagram of time-frequency resources occupied by a radio signal according to one embodiment of the present disclosure.

Embodiment 10 illustrates a schematic diagram of time-frequency resources occupied by a radio signal, as shown in FIG. 10. In FIG. 10, the horizontal axis and the vertical axis respectively represent time and frequency. Each small box represents a Resource Element (RE).

In Embodiment 10, REs respectively marked by $\{0\_0, 1\_0, 2\_0 \ldots, P\_0\}$; $\{0\_1, 1\_1, 2\_1, 3\_1 \ldots, P\_1\}$; $\{0\_2, 1\_2, 2\_2, 3\_2 \ldots, P\_V\}$ are respectively occupied by a radio signal, and respectively belong to V multicarrier symbols.

In one embodiment, time-frequency resources occupied by any radio signal in the first signal set comprise REs represented by $\{0\_0, 1\_0, 2\_0 \ldots, P\_0\}$; $\{0\_1, 1\_1, 2\_1, 3\_1 \ldots, P\_1\}$; $\{0\_2, 1\_2, 2\_2, 3\_2 \ldots, P\_V\}$.

In one embodiment, time-frequency resources occupied by the second radio signal comprise REs represented by $\{0\_0, 1\_0, 2\_0 \ldots, P\_0\}$; $\{0\_1, 1\_1, 2\_1, 3\_1 \ldots, P\_1\}$; $\{0\_2, 1\_2, 2\_2, 3\_2 \ldots, P\_V\}$.

In one embodiment, modulation symbols obtained by bits in a first bit block through modulation are sequentially mapped to REs in the second radio signal that are still unoccupied by DMRS according to the rule of firstly in frequency domain and secondly in time domain.

In one embodiment, part of bits in a first bit block are extracted to constitute a second bit block, and modulation symbols obtained by bits in the second bit block through modulation are sequentially mapped to time-frequency resources occupied by the second radio signal according to the rule of firstly in frequency domain and secondly in time domain, namely, in the order of $\{0\_0, 1\_0, 2\_0 \ldots, P\_0; 0\_1, 1\_1, 2\_1, 3\_1 \ldots, P\_1; \ldots \}$.

In one embodiment, modulation symbols obtained by bits in the second bit block through modulation are sequentially mapped to REs in the second radio signal that are still unoccupied by DMRS according to the rule of firstly in frequency domain and secondly in time domain.

In one embodiment, modulation symbols obtained by bits in the first bit block through modulation are sequentially mapped to REs in the second radio signal that are still unoccupied by DMRS according to the rule of firstly in frequency domain and secondly in time domain.

In one embodiment, bits in the second bit block comprise UCI, and a position of the UCI in the second bit block is before positions of bits comprised by the first bit block in the second bit block.

In one embodiment, REs represented by small grey boxes in FIG. 10 are allocated to DMRS of the second radio signal.

In one embodiment, P is a positive integral multiple of 12.

In one embodiment, V is 1.

In one embodiment, V is 2.

In one embodiment, V is 7.

In one embodiment, V is 14.

Embodiment 11

Figure 11:
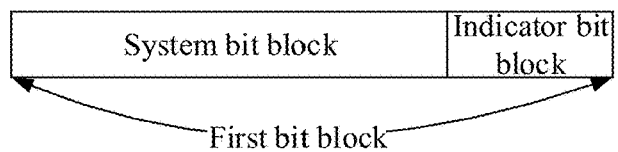
FIG. 11 illustrates a schematic diagram of a first bit block according to one embodiment of the present disclosure.

Embodiment 11 illustrates a schematic diagram of a first bit block, as shown in FIG. 11.

In Embodiment 11, a first bit block comprises a system bit block and an indicator bit block.

In one embodiment, the indicator bit block indicates a transmitter of the first bit block.

In one embodiment, CRC of the system bit block in the first bit block is used to generate the indicator bit block in the first bit block.

In one embodiment, the indicator bit block in the first bit block is obtained by CRC of the system bit block in the first bit block being scrambled.

In one embodiment, the first bit block is transmitted by a UE.

In one embodiment, the first signal set comprises only one radio signal.

In one embodiment, the first signal set is transmitted on a PUSCH.

In one embodiment, a second radio signal is an output by the first bit block sequentially through a Modulation Mapper, a Layer Mapper, Precoding, a Resource Element Mapper and Multicarrier Symbol Generation.

In one embodiment, a second radio signal is an output by the first bit block through a Modulation Mapper, a Resource Element Mapper and Multicarrier Symbol Generation.

Embodiment 12

Figure 12:
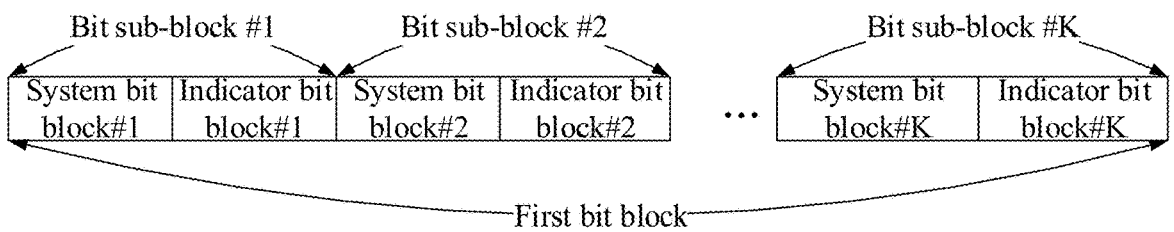
FIG. 12 illustrates a schematic diagram of a first bit block according to one embodiment of the present disclosure.

Embodiment 12 illustrates a schematic diagram of a first bit block, as shown in FIG. 12.

In Embodiment 12, a first bit block comprises K bit sub-blocks, which are bit sub-block #1, bit sub-block #2 . . . , and bit sub-block #K; each bit sub-block comprises a system bit block and an indicator bit block.

In one embodiment, the K bit sub-blocks are respectively transmitted by K transmitters.

In one embodiment, CRC of the system bit block in each of the K bit sub-blocks is used to generate the indicator bit block in the first bit block.

In one embodiment, the indicator bit block in the first bit block is obtained by CRC of the system bit block in the first bit block comprised by each of the K bit sub-blocks being scrambled.

Embodiment 13

Figure 13:
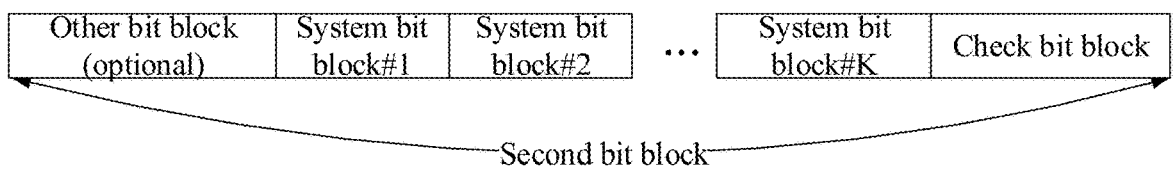
FIG. 13 illustrates a schematic diagram of a second bit block according to one embodiment of the present disclosure.

Embodiment 13 illustrates a schematic diagram of a second bit block, as shown in FIG. 13. In FIG. 13, the other bit block is optional.

In Embodiment 13, a first node recovers a first bit block according to a first signal set, and a second bit block comprises some bits selected from the first bit block; the second bit block is used for generating the second radio signal.

In one embodiment, the second radio signal is an output by the second bit block sequentially through a Modulation Mapper, a Layer Mapper, Precoding, a Resource Element Mapper and Multicarrier Symbol Generation.

In one embodiment, the second radio signal is an output by the second bit block through a Modulation Mapper, a Resource Element Mapper and Multicarrier Symbol Generation.

In one embodiment, the system bit block #1, system bit block #2 . . . , and system bit block #K shown in FIG. 13 are selected from the first bit block.

In one embodiment, the first bit block is given by FIG. 12; and the system bit block #1, system bit block #2 . . . , and system bit block #K shown in FIG. 13 are respectively the bit sub-block #1, the bit sub-block #2, . . . and the bit sub-block #K illustrated by FIG. 12.

In one embodiment, the system bit block #1, system bit block #2 . . . , and system bit block #K shown in FIG. 13 are used to generate a check bit block in FIG. 13.

In one embodiment, an information bit block formed by concatenating the system bit block #1, system bit block #2 . . . , and system bit block #K is used to generate CRC, and the check bit block is obtained by the CRC being scrambled.

In one embodiment, the second bit block comprises the other bit block, which is unrelated to the first bit block.

In one embodiment, the second bit sub-block comprises the other bit block, the other bit block being unrelated to the first signal set.

In one embodiment, the other bit block comprises UCI.

Embodiment 14

Figure 14:
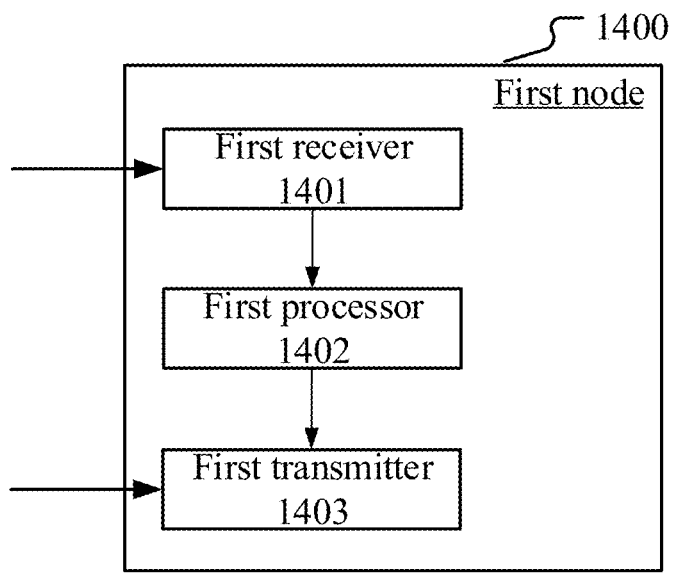
FIG. 14 illustrates a structure block diagram of a processing device in a first node according to one embodiment of the present disclosure.

Embodiment 14 illustrates a structure block diagram of a processing device in a first node, as shown in FIG. 14. In Embodiment 14, a first node 1400 comprises a first receiver 1401, a first processor 1402 and a first transmitter 1403.

The first receiver 1401 receives a first signal set in a first radio resource pool by blind detection, and recovers a first bit block on a physical layer according to the first signal set; the first processor 1402 delivers first buffer information from a physical layer to a higher layer; in instances when a first condition set is fulfilled, triggers first information on the higher layer; the first transmitter 1403 transmits a first radio signal, the first radio signal comprising the first information.

In Embodiment 14, the first information is used to indicate an amount of data available for transmission in a buffer, and the first condition set comprises a first condition, the first condition comprising first buffer information being delivered from a physical layer to a higher layer.

In one embodiment, the first receiver 1401 monitors target information in a second radio resource pool to determine that the first bit block is not correctly decoded by a target receiver.

In one embodiment, the first condition set comprises a second condition, the second condition comprising that there is no data available for transmission on all logical channels.

In one embodiment, the first condition set comprises a third condition, and the first buffer information indicates a first priority, the third condition comprising: the first priority is higher than priority of any logical channel of all logical channel groups in which data for transmission is already available.

In one embodiment, the first buffer information indicates a buffer size occupied by the first bit block.

In one embodiment, before transmission of the first radio signal, when a second condition set is fulfilled, the first processor 1402 triggers second information; herein, the second information is used for requesting channel resources; the second condition set comprises the first information not being cancelled and channel resources not being allocated.

In one embodiment, in instances when a third condition set is fulfilled, the first processor 1402 indicates that the physical layer transmits second information and the first transmitter transmits the second information; the first receiver 1401 receives a first signaling, the first signaling comprising scheduling information of the first radio signal; herein, the third condition set comprises at least one channel resource available for the second information being configured to a current Transmission Time Interval (TTI).

In one embodiment, the first receiver 1401 receives a second signaling; the first transmitter 1403 transmits a second radio signal; herein, the second signaling comprises scheduling information of the second radio signal, and the first bit block is used for generating the second radio signal.

In one embodiment, the first information is a Buffer Status Report.

In one embodiment, the first node 1400 is the node 450 in FIG. 4.

In one embodiment, the first node 1400 adopts the hardcore structure of the node 450 shown in FIG. 4, and a transmitter of the first signal set also adopts the hardcore structure of the said node 450.

In one embodiment, the first processor 1401 comprises the receiving processor 456 in FIG. 4.

In one embodiment, the first processor 1401 comprises the controller/processor 459 and the memory 460 in FIG. 4; the first receiver 1402 comprises the antenna 452, the receiver 454 and the receiving processor 456 in FIG. 4; the first transmitter 1403 comprises the antenna 452, the transmitter 454 and the transmitting processor 468 in FIG. 4.

In one embodiment, the first processor 1401 comprises the data source 467 in FIG. 4.

In one embodiment, the first processor 1401 comprises the memory 460 in FIG. 4.

In one embodiment, the memory 460 is used for buffering of the first node 1400.

In one embodiment, the first receiver 1401 comprises the multi-antenna receiving processor 458 in FIG. 4, and the first transmitter 1403 comprises the multi-antenna transmitting processor 457 in FIG. 4.

In one embodiment, the first receiver 1401 comprises the controller/processor 459 in

FIG. 4.

In one embodiment, the first information is a BSR.

In one embodiment, the first information is a Regular BSR.

Embodiment 15

Figure 15:
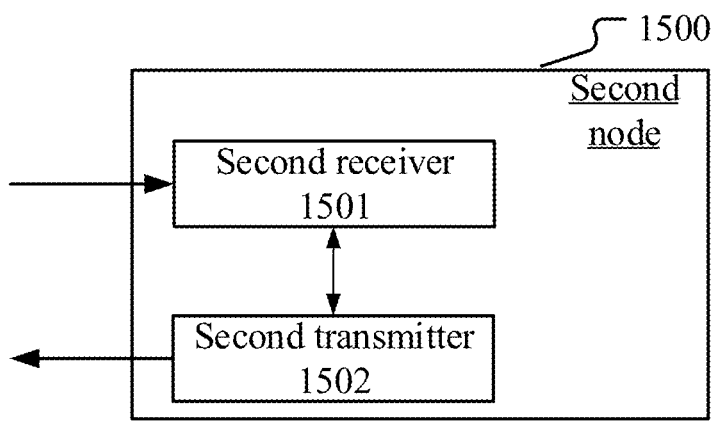
FIG. 15 illustrates a structure block diagram of a processing device in a second node according to one embodiment of the present disclosure.

Embodiment 15 illustrates a structure block diagram of a processing device in a second node, as shown in FIG. 15. In Embodiment 15, a second node 1500 comprises a second receiver 1501 and a second transmitter 1502, wherein the second transmitter 1502 is optional.

The second receiver 1501 performs blind detection in a first radio resource pool and fails to correctly decodes a first bit block; and receives a first radio signal, the first radio signal comprising first information.

In Embodiment 15, the first bit block is used to generate a first signal set to be transmitted in the first radio resource pool; the first information is used to indicate an amount of data available for transmission in a buffer; when a first condition set is fulfilled, the first information is triggered on a higher layer; the first condition set comprises a first condition, the first condition comprising first buffer information being delivered from a physical layer to a higher layer; the first radio signal is transmitted.

In one embodiment, the second transmitter 1502 indicates by target information that the first bit block is not correctly decoded in a second radio resource pool.

In one embodiment, the first condition set comprises a second condition, the second condition comprising that there is no data available for transmission on all logical channels.

In one embodiment, the first condition set comprises a third condition, and the first buffer information indicates a first priority, the third condition comprising: the first priority is higher than priority of any logical channel of all logical channel groups in which data for transmission is already available.

In one embodiment, the first buffer information indicates a buffer size occupied by the first bit block.

In one embodiment, before transmission of the first radio signal, when a second condition set is fulfilled, second information is triggered, the second information being used for requesting channel resources; the second condition set comprises the first information not being cancelled and channel resources not being allocated.

In one embodiment, in instances when a third condition set is fulfilled, the second receiver 1502 receives second information; the second transmitter 1502 transmits a first signaling, the first signaling comprising scheduling information of the first radio signal; herein, when the third condition set is fulfilled, it is indicated that a physical layer is to transmit second information; the third condition set comprises at least one channel resource available for the second information being configured to the Transmission Time Interval (TTI).

In one embodiment, the second transmitter 1502 transmits a second signaling; the second receiver 1501 receives a second radio signal; herein, the second signaling comprises scheduling information of the second radio signal, and the first bit block is used for generating the second radio signal.

In one embodiment, the first information is a Buffer Status Report.

In one embodiment, the first information is a BSR, and the second information is an SR.

In one embodiment, the first information is a Regular BSR, and the second information is an SR.

In one embodiment, the second node 1500 is the node 410 in FIG. 4.

In one embodiment, the second node 1500 adopts the hardcore structure of the node 410 shown in FIG. 4, and a transmitter of the first signal set adopts the hardcore structure of the node 450 shown in FIG. 4.

In one embodiment, the second transmitter 1502 comprises the antenna 420, the transmitter 418 and the transmitting processor 416 in FIG. 4; the second receiver 1501 comprises the antenna 420, the receiver 418 and the receiving processor 470 in FIG. 4.

In one embodiment, the second receiver 1502 comprises the multi-antenna receiving processor 472 in FIG. 4, and the second transmitter 1503 comprises the multi-antenna transmitting processor 471 in FIG. 4.

In one embodiment, the second transmitter 1503 comprises the controller/processor 459 in FIG. 4.

In one embodiment, the second receiver 1502 comprises the controller/processor 459 in FIG. 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver: receiving a first signal set in a first radio resource pool by blind detection, and recovering a first bit block on a physical layer according to the first signal set;
a first processor: delivering first buffer information from a physical layer to a higher layer; in instances when first condition set being fulfilled, triggering first information on the higher layer;
a first transmitter: transmitting a first radio signal, the first radio signal comprising the first information;
wherein the first information is used to indicate an amount of data available for transmission in a buffer, the first condition set comprises a first condition, and the first condition comprising first buffer information being delivered from a physical layer to a higher layer; the first node is a UE; the first information is used for requesting channel resources; the higher layer of the first node comprises a MAC layer of the first node.

2. The first node according to claim 1, comprising:
the first receiver: receiving a second signaling; and
the first transmitter: transmitting a second radio signal;
wherein the second signaling comprises scheduling information of the second radio signal, and the first bit block is used for generating the second radio signal.

3. The first node according to claim 1, wherein the first condition set comprises a second condition, the second condition comprising: there is no data available for transmission on all logical channels.

4. The first node according to claim 1, wherein the first condition set comprises a third condition, and the first buffer information indicates a first priority, the third condition comprising: the first priority is higher than priority of any logical channel of all logical channel groups in which data for transmission is already available.

5. The first node according to claim 1, wherein the first buffer information indicates a buffer size occupied by the first bit block.

6. The first node according to claim 1, wherein before transmission of the first radio signal, when a second condition set is fulfilled, the first processor triggers second information;
herein, the second information is used for requesting channel resources; the second condition set comprises the first information not being cancelled and channel resources not being allocated.

7. The first node according to claim 6, comprising:
in instances when a third condition set is fulfilled, the first processor indicating that the physical layer transmits second information and the first transmitter transmitting the second information;
the first receiver receiving a first signaling, the first signaling comprising scheduling information of the first radio signal;
herein, the third condition set comprises at least one channel resource available for the second information being configured to a current Transmission Time Interval (TTI).

8. The first node according to claim 2, wherein the second signaling is DCI used for uplink Grant, the second radio signal is transmitted on a first channel, and the scheduling information of the second radio signal is allocation information of the first channel; an identity of the first node is used for scrambling a bit block transmitted on the first channel.

9. The first node according to claim 2, wherein the first information is used for generating scheduling information in the second signaling, or, the first information is used for generating a number of REs occupied by the second radio signal.

10. The first node according to claim 1, wherein the first information is a scheduling request, or, the action of requesting channel resources comprises requesting UL-SCH resources, or, the first information is a Buffer Status Report.

11. The first node according to claim 10, wherein the first radio resource pool occupies at least one multicarrier symbol in time domain, and a positive integer number of subcarrier(s) in frequency domain, and a plurality of Multiple-Address (MA) Signatures in code domain.

12. The first node according to claim 1, wherein the first radio signal is transmitted in a Physical Uplink Control CHannel (PUCCH), and channel coding corresponding to the first bit block is based on a polar code.

13. The first node according to claim 10, wherein the first radio signal is transmitted in a Physical Uplink Control CHannel (PUCCH), and channel coding corresponding to the first bit block is based on a polar code.

14. The first node according to claim 12, wherein the first bit block is an output by the first signal set being sequentially through channel equalization, wideband symbol demodulation, de-resource element (RE)-mapping, de-layer mapping, de-scrambling and channel decoding; or, the first bit block is an output by the first signal set being through channel equalization, wideband symbol demodulation, de-resource element (RE)-mapping, de-scrambling and channel decoding; channel coding corresponding to the channel decoding is based on a polar code.

15. The first node according to claim 1, wherein the phrase of receiving a first signal set in a first radio resource pool by blind detection comprises: before correctly decoding the first signal set, the first node is incapable of determining whether the first signal set is to be transmitted in the first radio resource pool; or, the first node performs Q channel decodings in the first radio resource pool, Q being a positive integer greater than 1. Each of the Q channel decodings comprises: determining a corresponding radio signal is correctly received according to CRC. The first signal set comprises Q1 radio signals, and the Q1 radio signals are correctly received by Q1 channel decodings of the Q channel decodings, respectively, Q1 being a positive integer no greater than Q; or, the first signal set comprises Q1 radio signals, and the first node performs Q characteristic sequence detections in the first radio resource pool, Q being a positive integer greater than 1. Each of the Q characteristic sequence detections comprises determining whether a corresponding radio signal is transmitted according to coherent detection on sequences, and Q1 characteristic sequence detections of the Q characteristic sequence detections are respectively used to determine that the Q1 radio signals are transmitted, Q1 being a positive integer no greater than Q.

16. A second node for wireless communications, comprising:
a second receiver: performing blind detection in a first radio resource pool, and failing to correctly decode a first bit block; and receiving a first radio signal, the first radio signal comprising first information;
wherein the first bit block is used to generate a first signal set to be transmitted in the first radio resource pool; the first information is used to indicate an amount of data available for transmission in a buffer; when a first condition set is fulfilled, the first information is triggered on a higher layer; the first condition set comprises a first condition, the first condition comprising first buffer information being delivered from a physical layer to a higher layer; a transmitter of the first radio signal is UE; the first information is used for requesting channel resources; the higher layer comprises a MAC layer.

17. A method in a first node for wireless communications, comprising:
receiving a first signal set in a first radio resource pool by blind detection, and recovering a first bit block on a physical layer according to the first signal set;
delivering first buffer information from a physical layer to a higher layer; in instances when first condition set being fulfilled, triggering first information on the higher layer;
transmitting a first radio signal, the first radio signal comprising the first information;
wherein the first information is used to indicate an amount of data available for transmission in a buffer, the first condition set comprises a first condition, and the first condition comprising first buffer information being delivered from a physical layer to a higher layer; the first node is a UE; the first information is used for requesting channel resources; the higher layer of the first node comprises a MAC layer of the first node.

18. The method in the first node according to claim 17, comprising:
receiving a second signaling; and
transmitting a second radio signal;
wherein the second signaling comprises scheduling information of the second radio signal, and the first bit block is used for generating the second radio signal.

19. The method in the first node according to claim 17, wherein the first condition set comprises a second condition, the second condition comprising: there is no data available for transmission on all logical channels.

20. The method in the first node according to claim 17, wherein the first condition set comprises a third condition, and the first buffer information indicates a first priority, the third condition comprising: the first priority is higher than priority of any logical channel of all logical channel groups in which data for transmission is already available.

\* \* \* \* \*